(No Model.) 2 Sheets—Sheet 1.
E. P. VOISARD.
ICE CREAM FREEZER.
No. 483,029. Patented Sept. 20, 1892.
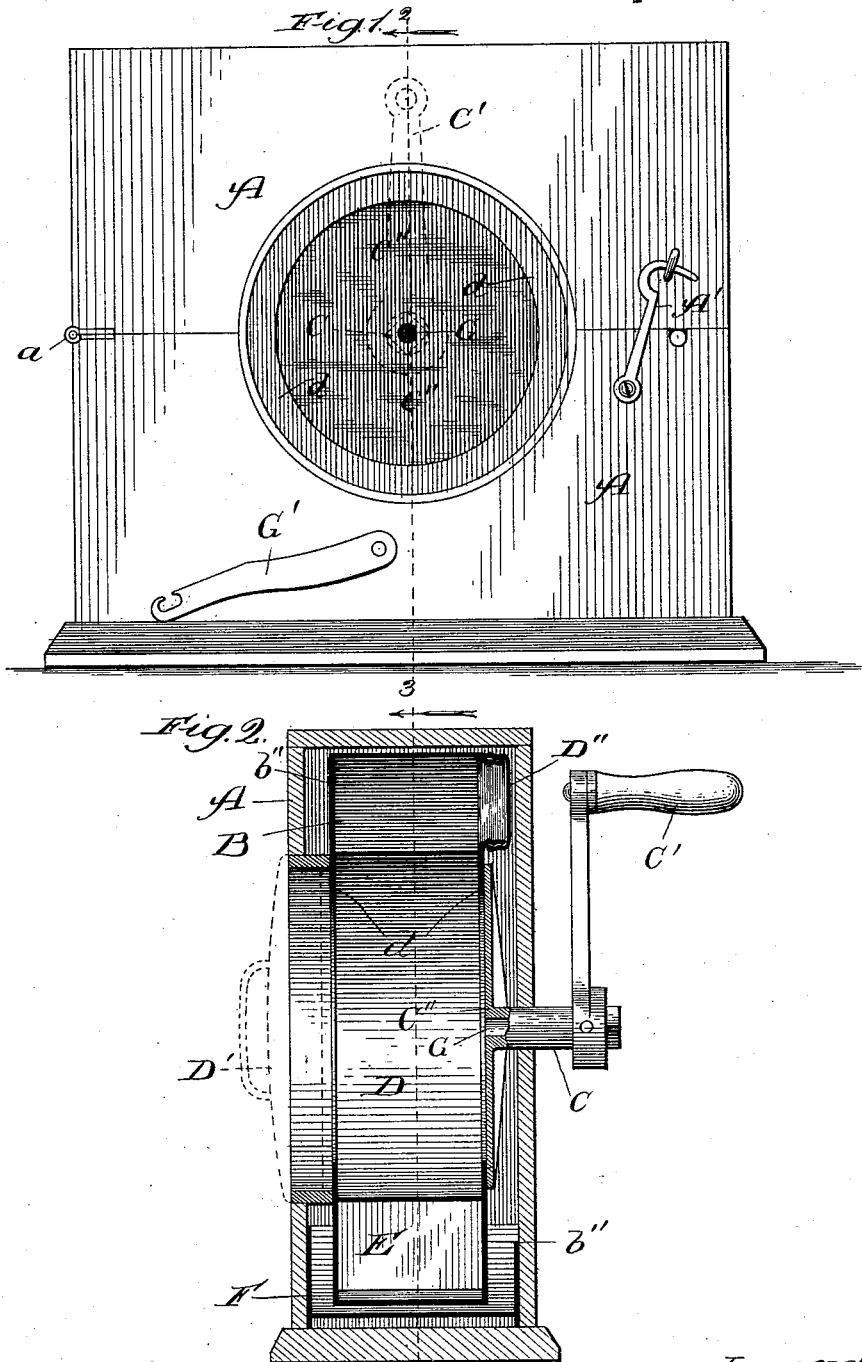
Witnesses:
Clifford H. White
Samuel E. Hibben
Inventor:
Emile P. Voisard,
By Banning & Banning & Payson
Att'ys (No Model.) 2 Sheets—Sheet 2.

E. P. VOISARD.
ICE CREAM FREEZER.

No. 483,029. Patented Sept. 20, 1892.

Witnesses:
Clifford N. White.
Samuel E. Hibben

Inventor:
Emile P. Voisard,
By Banning & Banning & Payson,
Att'ys

THE NORRIS PETERS CO., PHOTO-LITHO., WASHINGTON, D. C.

UNITED STATES PATENT OFFICE.

EMILE P. VOISARD, OF CHICAGO, ILLINOIS.

ICE-CREAM FREEZER.

SPECIFICATION forming part of Letters Patent No. 483,029, dated September 20, 1892.

Application filed December 29, 1891. Serial No. 416,439. (No model.)

*To all whom it may concern:*

Be it known that I, EMILE P. VOISARD, a citizen of the United States, residing at Chicago, Illinois, have invented certain new and useful Improvements in Freezing Apparatus, of which the following is a specification.

My invention relates to that class of machines used for the production of ice, ice-cream, &c., and embodies a cylinder revolved by suitable means, the refrigerant being placed within the cylinder and the operation of the machine being such that the ice or ice-cream is formed both in a chamber within the cylinder and also on the outside of the cylinder, so that the operation of freezing can be carried on practically continuously when once commenced.

The object of my invention is to simplify the construction of freezing apparatus of this description and to improve upon those heretofore used in various particulars, as hereinafter more specifically pointed out.

My improvements further relate to novel means for holding the substance to be frozen outside of the cylinder and for removing the ice or frozen cream from both the interior of the cylinder and the exterior thereof.

My invention consists in the features and details of construction hereinafter described and claimed.

Figure 3:
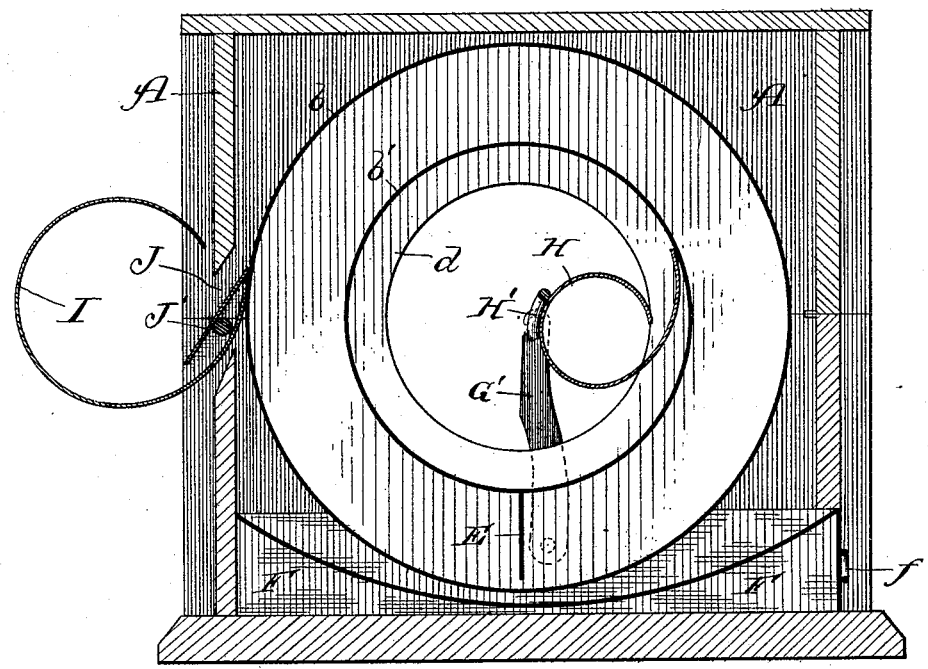

In the drawings, Figure 1 is a side elevation of a freezing apparatus embodying my improvements, being the left-hand side of such apparatus as shown in Fig. 2; Fig. 2, a cross-section on line 2 of Fig. 1, and Fig. 3 a similar section on line 3 of Fig. 2, both sections being taken looking in the direction of the arrows; and Fig. 4, a perspective view of my improved device for removing the ice or ice-cream from within the cylinder.

In constructing my improved freezing apparatus I first make a box or case A of suitable form and dimensions to accommodate the parts of the apparatus and permit their operation in the manner hereinafter described. This box is preferably made in two parts, as shown, hinged together at $a$ and provided with a hook or other suitable fastening A'. Within the box is an annular cylinder B, preferably of the form shown in the drawings, being formed of two cylinders $b$ $b'$, of tin or other suitable material, secured together by side pieces $b''$. Attached to this cylinder is a journal C, supported in the side of the case and provided with a suitable handle C', by means whereof the cylinder is revolved, the journal being connected to the cylinder by means of a disk C'', as shown more particularly in Fig. 1.

As shown, the cylinder is provided with an inner chamber or receptacle D, adapted to be closed when the device is in use by a cover D'. The cylinder is further provided with an opening closed by a screw-cap, through which opening the freezing mixture is introduced into the cylinder. The interior of the cylinder is preferably partially divided by a partition E, which prevents the ice from accumulating at any one point, but which preferably does not extend entirely across the interior of the machine, so that the liquid of the freezing material is enabled to pass around through the cylinder.

In the lower part of the case is a drawer F, preferably of the shape shown, wherein the bottom is curved, so as to fit beneath the cylinder, but to extend up behind the same, so as to render it impossible to entirely remove the drawer unless the cylinder is first taken out. This drawer may be provided with a suitable handle $f$, whereby it is partially drawn out when desired.

Figure 4:
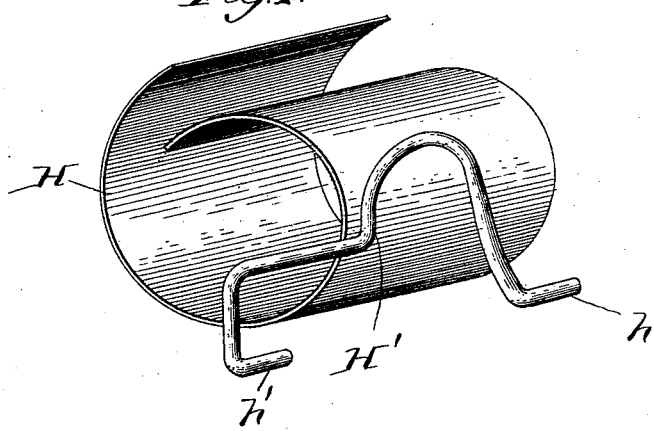

The parts already described operate as follows: The freezing mixture having been placed in the cylinder, water, cream, or whatever else it is desired to freeze is introduced into the chamber D within the cylinder, from which it is prevented from flowing by means of an annular flange $d$. The drawer F is also drawn out as far as possible and cream or other substance introduced therein, after which the drawer may be closed, the cover D' inserted in place, the case or box A closed, and the cylinder revolved by means of its handle, thereby freezing the substances placed both in the chamber within the cylinder and in the drawer outside thereof. When these substances have been sufficiently frozen, they may be removed in the following manner: Fig. 4 shows a sheet H of tin or other suitable substance, preferably curved until one edge somewhat overlaps the other, but so that the edges do not touch the other, and provided with an arm or crank H'. One end of this arm $h$ is inserted into a hole G in the journal C and the other end $h'$ engaged by a swinging hook G', attached to the case and shown more particularly in Figs. 1 and 3. This supports the scraper H in the position shown in Fig. 3, and as the cylinder is revolved toward the right the frozen ice or cream, which will adhere to the sides of the receptacle D, will be removed and collected into this scraper in the form of a cylindrical block. After this operation the ice-cream or ice formed by the revolution of the cylinder through the substance contained in the drawer and adhering to the exterior surface of the cylinder may be removed by the use of a somewhat-similarly-formed scraper I, adapted to be held in the hand of the operator and have one end inserted through a hole J in the side of the case until such end comes in contact with the side of the cylinder, when it will remove the ice or cream therefrom and receive it into the cylindrical portion of the scraper. A plate J' normally closes the opening J to prevent the warmer exterior air from entering within the box, and when desired may be swung forward, as shown, to act as a scraper to remove the frozen substance from the exterior of the cylinder. The frozen substance is thus delivered into the scraper I, which then acts as a receptacle to hold or mold the frozen material into cylindrical blocks.

By means of the devices above described I provide the first machine, with which, so far as I am acquainted, it is possible to carry on the freezing process continually, and this is accomplished with my machine as follows: When the substance in the chamber D has been sufficiently frozen, it may be removed by means of the scraper while the material in the drawer is still being frozen. As soon as the frozen substance has been entirely removed from the chamber D a fresh charge of cream, water, or other substance may be introduced into this chamber and frozen. While this is being frozen, the ice or cream already formed in the drawer may be removed by means of the scraper and a new charge inserted into the drawer, by which time the material in the chamber D will have been frozen and may be removed. In this way the process is carried on continually, ice or cream being formed in the interior chamber while it is being removed from the drawer, and, vice versa, formed in the drawer while it is being removed from the chamber, and, so far as I am aware, this is the first freezing apparatus with which this continuous process can be carried on.

While I have described more or less precise means, it is not my intention to limit myself thereto, inasmuch as I contemplate changes in form, proportions, and the substitution of equivalent members, as may be desirable or necessary.

I claim—

1. A freezing apparatus comprising a revolving cylinder provided with an ice-chamber, a space or receptacle inside the cylinder for substances to be frozen, and a space or receptacle outside the cylinder for substances to be frozen, substantially as described.

2. A freezing apparatus consisting of a revolving annular cylinder both of whose internal and external surfaces are adapted to receive the substance to be frozen, whereby the frozen material may be removed from one surface while it is being frozen upon the other, and vice versa, thus maintaining a continuous production, substantially as described.

3. In a freezing apparatus, the combination of a cylinder provided with a chamber D and revolving within a suitable case, and a scraper H for removing the contents of such chamber, supported at one end by the cylinder and at the other by means of a swinging arm attached to the case, substantially as described.

4. In a freezing apparatus, the combination of a case provided with an opening J, a drawer to contain the freezing mixture placed within such case, a cylinder revolving in the case and dipping into the drawer, and a substantially cylindrical scraper I, adapted to be inserted through the opening J, contacting with the exterior of the cylinder and removing the frozen substance therefrom, substantially as described.

5. In a freezing apparatus, the combination of a cylinder revolving in a suitable case provided with an opening, and a plate pivotally supported in the case and adapted to act as a scraper to remove the frozen substance from the exterior of the cylinder and when not used as a scraper to close the opening to prevent warm air from entering the case, substantially as described.

EMILE P. VOISARD.

Witnesses:
EPHRAIM BANNING,
ANNIE C. COURTENAY.